United States Patent [19]

Moczygemba

[11] 4,049,753
[45] Sept. 20, 1977

[54] COUPLING OF ALKALI METAL-TERMINATED POLYMERS

[75] Inventor: George A. Moczygemba, Bartlesville, Okla.

[73] Assignee: Phillips Petroleum Company, Bartlesville, Okla.

[21] Appl. No.: 678,096

[22] Filed: Apr. 19, 1976

[51] Int. Cl.² ............ C08F 8/00; C08F 8/02; C08F 8/06; C08F 8/10
[52] U.S. Cl. .............. 260/880 B; 260/879; 526/20; 526/21; 526/56
[58] Field of Search ............ 526/20, 21, 56; 260/879, 880 B

[56] References Cited

U.S. PATENT DOCUMENTS

| | | | |
|---|---|---|---|
| 3,135,716 | 6/1964 | Uraneck et al. | 260/45.5 |
| 3,281,383 | 10/1966 | Zelinski et al. | 260/23.7 |
| 3,551,392 | 12/1970 | Snyder et al. | 526/56 |
| 3,631,156 | 12/1971 | Vaughn et al. | 526/56 |
| 3,651,025 | 3/1972 | Bean et al. | 526/56 |
| 3,668,279 | 6/1972 | Loveless et al. | 260/879 |
| 3,766,301 | 10/1973 | DeLa Mave et al. | 260/879 |
| 3,803,087 | 4/1974 | Vaughn | 526/56 |

*Primary Examiner*—William F. Hamrock

[57] ABSTRACT

Alkali metal-terminated polymers of one or more alkadienes and of one or more vinyl-substituted aromatic monomers are effectively coupled by an anhydride of a monocarboxylic acid having 2 to 8 carbon atoms per molecule.

6 Claims, No Drawings

COUPLING OF ALKALI METAL-TERMINATED POLYMERS

This invention relates to novel coupled polymers. In one of its more specific aspects, this invention relates to a process for the production of such coupled polymers. Another aspect of this invention relates to the coupling of alkali metal-terminated polymers.

BACKGROUND OF THE INVENTION

It is well known in the art that acyclic conjugated alkadienes, as well as vinyl-substituted aromatic monomers as such or in admixture with each other, can be polymerized utilizing an alkali metal initiator system. Various homopolymers, random or tapered copolymers, as well as block copolymers with a wide scale of properties have been produced by this polymerization system.

It is also known in the art that alkali metal-terminated polymers obtained by such a polymerization process, such as lithium-terminated polymers, can be coupled in order to produce polymers with specific properties. In accordance with this known process, an alkali metal-terminated polymer is treated with a compound having two or more functional groups containing two or more reactive sites capable of reacting with the carbon-alkali metal bonds of the alkali metal-terminated polymer. A multifunctional coupling agent thereby becomes a nucleus for the resulting structure. From this nucleus long-chain polymer branches radiate, and such coupled polymers have specific properties that render them useful for particular applications.

Coupled polymers that are derived from coupling agents possessing three or more reactive sites are frequently called radial polymers. Such radial polymers have been of particular interest because of their increased Mooney viscosity, improved processability, and reduced cold flow as compared to the uncoupled or parent polymers. Hydrogenation of the alkadiene-based radial polymers has received considerable attention in recent years because the hydrogenation of such polymers increases the resistance of such polymers to environmental attack, e.g., oxygen and/or ozone deterioration.

It has, however, been found that some of these radial polymers are not sufficiently stable under hydrogenation conditions. More specifically, it has been found that radial polymers that have a connection between an inorganic atom and the first carbon atom of the parent polymer chain sometimes are not as stable as radial polymers in which the connection between the coupling agent and the polymer is a carbon-carbon bond. If this cleavage of the bond between the inorganic atom of the coupling agent and the carbon atom of the polymer chain occurs, the hydrogenated radial polymer is admixed with hydrogenated but no longer coupled polymer chains. This effect can impair the properties of the coupled polymer. Therefore, it would be desirable to have a coupled polymer which is formed from a coupling agent which does not contain inorganic atoms connected to its active sites and at the same time provides a high degree of coupling efficiency.

THE INVENTION

It is thus one object of this invention to provide novel coupled polymers.

Another object of this invention is to provide a process for the production of polymers that can be effectively hydrogenated without adverse effect on the coupled polymer.

A further object of this invention is to provide a process to produce hydrogenated polymers.

Still another object of this invention is to provide a process for coupling alkali metal-terminated polymers.

Yet another object of this invention is to provide a novel coupling agent.

These and other objects, features, details and advantages of the present invention will become apparent to those skilled in the art from the following detailed description of the invention and the appended claims.

In accordance with this invention, I have now found that alkali metal-terminated polymers can effectively be coupled utilizing an acyclic anhydride of a monocarboxylic acid having 2 to 8 carbon atoms per molecule as the coupling agent. The preferred group of coupling agents consists of the anhydrides of acyclic, saturated monocarboxylic acids having 2 to 4 carbon atoms per molecule. The most preferred coupling agent is acetic anhydride.

In accordance with one embodiment of this invention, there is therefore provided a coupled polymer having the formula

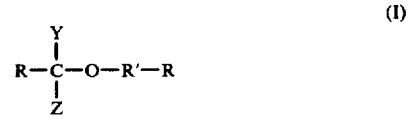

(I)

wherein the radicals R, which can be the same or different, are selected from the group of hydrocarbyl radicals of 1 to 7 carbon atoms, R' is selected from the group of bivalent radicals consisting of

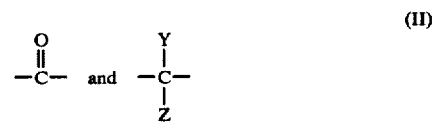

(II)

wherein Y is —OH or —Z, wherein Z is a homopolymer or copolymer chain of one or more alkadienes of 4 to 12 carbon atoms per molecule, or a copolymer chain of at least one alkadiene of 4 to 12 carbon atoms per molecule and at least one monovinyl-substituted arene radical of 8 to 18 carbon atoms per molecule, the vinyl radical being attached to a carbon atom of the arene ring, with the further provision that at least 160 polymer chains Z are present in 100 molecules of formula (I). In the embodiment of the hydrogenated polymers, preferably 30 to 99% of the olefinic unsaturation of the polymer is removed by hydrogenation.

The preferred group of acyclic conjugated alkadienes that can be polymerized into the polymer chain Z are those containing 4 to 8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene. A more narrow group of alkadienes in accordance with this invention is defined to include butadiene, isoprene, piperylene and mixtures thereof. Among these butadiene and/or isoprene are particularly preferred.

Monovinylarenes that can be polymerized together with the alkadienes to form the polymer chain Z preferably are those selected from the group of styrene, the methylstyrenes, particularly 3-methylstyrene, the propylstyrenes, particularly 4-propylstyrene, vinylnaphthalene, particularly 1-vinylnaphthalene, cyclohexylstyrenes, particularly 4-cyclohexylstyrene, p-tolylstyrene, and 1-vinyl-5-hexylnaphthalene, styrene and the methylstyrenes being the preferred group. Styrene is the most preferred monovinylarene.

The polymer chains Z can be homopolymers or copolymers of the alkadiene monomers defined or can be copolymers of alkadiene monomers and monovinyl-substituted aromatic monomers. These copolymers, in turn, can be random or tapered copolymers, as well as block copolymers of these various monomers. The presently preferred monomers are 1,3-butadiene and styrene. The presently preferred polymer chains Z are those in which the conjugated dienes are present in a major amount and the monovinyl-substituted arenes are present in a minor amount.

The molecular weight of the polymers of this invention can vary in broad ranges. For the usual applications of the coupled polymers, the weight average molecular weight will be in the range of about 10,000 to about 2,000,000.

Those polymers in which the polymer chain Z has a structure A-B- so that B is attached to the coupling agent, and in which A represents a block of monovinylarenes, preferably a polystyrene block, and B represents a block that confers rubbery properties to the polymer chain, such as a polyalkadiene block, a copolymer block of an alkadiene and a monovinyl-substituted arene, or a combination of such blocks, constitute presently preferred polymers. Such a polymer exhibits properties both of an elastomer and of a thermoplastic polymer. Therefore, such polymers can be formed into articles by standard procedures known for producing articles from thermoplastic polymers while the finished article exhibits elastomeric properties.

As an example, the preparation of such a thermoplastic elastomer is described in the following. This polymer can be prepared by a process wherein styrene is first polymerized with a monofunctional alkali metal initiator system to form an alkali metal-terminated polystyrene block, wherein then an alkadiene such as butadiene and/or isoprene alone or in admixture, with styrene and/or a methylstyrene is blended into the polymer mixture to form a polymer having the structure polystyrene-rubbery block-alkali metal and wherein this polymer is finally coupled with the anhydride coupling agent defined above. Thereby a coupled teleblock copolymer is otained having polystyrene blocks at the free ends of the polymer chains.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between an alkali metal-terminated polymer having the formula M-Z, wherein M is an alkali metal atom and Z is the polymer chain as defined above with a coupling agent having the formula

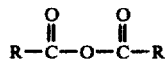

wherein the radicals R, which can be the same or different, are hydrocarbyl radicals with 1 to 7 carbon atoms.

The preferred group of coupling agents consists of those anhydrides in which the radicals R the same and are alkyl radicals with 1 to 3 carbon atoms. Acetic anhydride is the presently preferred coupling agent.

The quantity of the coupling agent employed with respect to the quantity of the alkali metal-terminated polymer M-Z depends largely upon the degree of coupling and the properties of the coupled polymer desired. Preferably the coupling agent defined above will be employed in a range of about 0.1 to about 1.5 moles of coupling agent per gram atom of alkali metal present in the polymer mixture. In other words, the coupling agent is employed in a quantity so that about 0.1 to about 1.5 anhydride molcules are present per alkali metal atom. Using about ½ of a mole of the coupling agent defined per gram atom of alkali metal will result in the maximum coupling efficiency and is presently preferred.

The temperature at which the coupling reaction is carried out can vary over a broad range and, for convenience, often is the same as the temperature of polymerization. Although the temperature can vary broadly from such as 0° to 150° C, it will preferably be within the range from about 20° to 100° C.

The coupling reaction is normally carried out by simply mixing the coupling agent, neat or in solution, with the alkali metal-terminated polymer solution. The reaction period is usually quite short. The normal duration of the coupling reaction will be in the range of 1 minute to 1 hour. Longer coupling periods may be required at lower temperatures.

After the coupling reaction, the coupled polymers are recovered by treating the reaction mixture with agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable non-solvent such as an alcohol. The coagulated or stripped polymer is then removed from the resulting medium by, e.g., filtration. Residual solvent and other volatiles can be removed from the isolated polymer by heating, optionally under reduced pressure or in a forced air flow.

Compounding ingredients such as fillers, dyes, pigments, softeners and reinforcing agents can be added to the polymer during compounding operations.

In accordance with a further embodiment of this invention, there is provided a process for producing the polymers as defined above. This process includes basically two steps. The first step is the step in which an alkali metal-terminated polymer having the formula M-Z is produced. The second step is that in which this alkali metal-terminated polymer is coupled with the coupling agent of this invention as defined above.

The first step of this process is carried out by reacting a mono-functional alkali metal initiator system with the respective monomer or monomers to form the alkali metal-terminated polymer chain M-Z. This polymerization step can be carried out in one step or in a sequence of steps. In the case where the polymer chain Z is a homopolymer or a random or tapered copolymer of two or more monomers, the monomers are simultaneously polymerized with the alkali metal initiator. In the case where the polymer chain Z is a block polymer comprising two or more homo- or copolymer blocks, these individual blocks can be generated by incremental or sequential monomer addition.

The monomers that are generally employed, as well as the monomers that are preferably used, have been defined above in connection with the novel polymers of this invention. These monomers are also preferred for the process of the present invention.

Whereas several alkali metal-based initiator systems can be used in the first step of the process to make the coupled polymers of this invention, those that are based on lithium having the general formula R"Li wherein R" is a hydrocarbyl radical of 1 to about 20 carbon atoms are presently preferred. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the alkali metal initiator employed depends upon the desired properties of the polymer, particularly the desired molecular weight. Normally the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction in step 1 usually occurs within a period of time ranging from a few minutes up to about 6 hours. Preferably, the reaction is carried out within a time period of about 10 minutes to about 2 hours. The polymerization temperature is not critical and will generally be in a range of about 15° to about 150° C, preferably in a range of about 40° to about 90° C.

At the conclusion of the polymerization in order to carry out the second or coupling step, the polymerization mixture is blended with the coupling agent. This is done before any material that would terminate the polymerization reaction and that would remove the alkali metal atom from the polymer chain is added to the reaction mixture. Thus the blending of the polymerization mixture and the coupling agent is carried out before any material such as water, acid or alcohol, is added to inactivate the alkali metal-terminated polymer. The second step of coupling the alkali metal-terminated polymer is thus carried out as described in detail above.

Various materials are known to be detrimental to the alkali metal-initiated polymerization. Particularly, the presence of carbon dioxide, oxygen and water should be avoided during an organomonolithium-initiated polymerization reaction of step 1 of this combined process for making the coupled copolymers. Therefore, it is generally preferred that the reactants, initiators and the equipment be free of these materials and that the reaction is carried out under an inert gas such as nitrogen.

In accordance with still a further embodiment of this invention, there is provided a process for the production of polymers in accordance with the formula defined above in which the polymer chain substituents Z are at least partially hydrogenated such as to remove at least a portion of the olefinic unsaturation in the polymer chains Z, which comprise alkadiene-derived units. This process basically encompasses three steps, namely a first step for producing an alkali metal-terminated polymer, a second step for coupling the alkali metal-terminated polymer and a third step for hydrogenating the coupled polymer. The first and second steps have been described in detail above and the preferred embodiments of these steps disclosed above also are preferred embodiments for this combined process for producing a hydrogenated copolymer.

The third step of hydrogenating the coupled copolymer is carried out by blending the coupled polymer solution with a hydrogenation catalyst and free hydrogen under hydrogenation conditions. Examples of hydrogenation catalysts include nickel on Kieselguhr, Raney nickel, copper chromite, molybdenum sulfide, platinum group metals, carboxylate and alkoxides of nickel and/or cobalt reduced by trialkyl aluminum. More specifically and in accordance with further preferred embodiments, this third or hydrogenation step is generally carried out as shown in the following table:

| Ranges for Hydrogenation Step Features | | |
|---|---|---|
| | Usually Employed | Preferred Range |
| Hydrogenation catalyst, php[a] | 0.05 to 20 | 0.1 to 2 |
| Hydrogenation temperature | 0 – 250° C | 10 – 200° C |
| Hydrogen | 35 to 35,000 kPa | 70 to 3500 kPa |
| Hydrogenation time | 1 min. to 25 hrs. | 10 min. to 10 hrs. |

[a]Parts by weight per 100 parts by weight polymer.

In this embodiment of the invention, the recovery of the polymer is carried out after the hydrogenation. Antioxidants usually are added to the polymer solution. The hydrogenation catalyst is normally removed by filtration after which the hydrogenated polymer is recovered by, e.g., steam stripping or alcohol coagulation and subsequent filtration.

The polymers of this invention can be used in the fabrication of hoses, belting, extruded or molded goods and in formulating adhesives for both solution and hot melt techniques for diverse applications including those in the building construction, transportaton, medical and household article fields.

The present invention will still be more fully understood from the following examples which illustrate preferred embodiments of the invention but are not intended to limit the scope thereof.

EXAMPLE I

A lithium-terminated polybutadiene was produced by polymerizing butadiene using cyclohexane as a diluent and n-butyllithium as the initiator. The polymerization was carried out by standard bottle techniques and under a nitrogen atmosphere. The recipe and the polymerization conditions are shown in the following Table I.

TABLE I

| Recipe | | |
|---|---|---|
| | phm[a] | mhm[b] |
| Cyclohexane | 780 | |
| 1,3-Butadiene | 100 | |
| n-Butyllithium | 0.083 | 1.3[c] |
| Conditions | | |
| Polymerization time, minutes | 50 | |

TABLE I-continued

| Polymerization temperature, ° C | 70 |
|---|---|

(a)Parts by weight per hundred parts of monomer.
(b)Gram millimoles per hundred grams of monomer.
(c)Active amount, i.e., above scavenger quantity.

The lithium-terminated polybutadiene obtained in this example was then further used in Example II.

EXAMPLE II

In five separate runs varying amounts of acetic anhydride were added to samples of the solution of the lithium-terminated polybutadiene obtained in Example I. The acetic anhydride was added to the polymer-lithium solution in a single charge and the mixture was stirred throughout the coupling period. The coupling was carried out at a temperature of 70° C for 60 minutes. The coupled polymers obtained were isolated by isopropyl alcohol coagulation and vacuum drying. The Mooney viscosity, the inherent viscosity, and the gel content of the coupled polymers were determined. The results of these physical determinations are shown in the following Table II.

TABLE II

| Run No. | Acetic Anhy. phm$^{(a)}$ | mhm$^{(e)}$ | ML-4 at 212° F$^{(b)}$ | Inh Vis.$^{(c)}$ | Gel wt. %$^{(d)}$ |
|---|---|---|---|---|---|
| 1 | 0 | | 7 | 1.83 | 0 |
| 2 | 0.025 | 0.245 | 22 | 1.88 | 0 |
| 3 | 0.05 | 0.49 | 26.5 | 1.99 | 0 |
| 4 | 0.1 | 0.98 | 26.5 | 2.05 | 0 |
| 5 | 0.2 | 1.96 | 29 | 2.03 | 0 |

(a)Part by weight per hundred parts monomers.
(b)ASTM D 1646-63.
(c)Inherent viscosity was determined in accordance with U.S. 3,278,508, column 20, note a with the modification that the solution was not filtered through a sulfur absorption tube but rather a sample of the solution was filtered through a fritted glass filter stick of grade C porosity and pressured directly into the viscometer.
(d)The gel content of the polymer was determined in weight percent in accordance with U.S. Pat. No. 3,278,508, column 20, note b.
(e)See footnote (b) Table I.

The increases in Mooney viscosity and in inherent viscosity of the polymers produced indicate that acetic anhydride acts as an effective coupling agent for coupling alkali metal-terminated polymers.

EXAMPLE III

Examples I and II were repeated utilizing the following recipe, polymerization conditions, and coupling conditions.

| Recipe | phm | mhm$^{(a)}$ |
|---|---|---|
| Cyclohexane | 760 | |
| 1,3-Butadiene | 100 | |
| Tetrahydrofuran | 2.3 | |
| n-Butyllithium | | 1.0$^{(b)}$ |
| Polymerization Conditions | | |
| Polymerization time, min. | 30 | |
| Polymerization temperature, ° C | 70 | |
| Coupling Conditions | | |
| Acetic anhydride | variable | |
| Coupling time, min. | 30 | |
| Coupling temperature, ° C | 70 | |

(a)Gram millimoles per hundred grams of monomer.
(b)Active amount in gram millimoles per 100 grams of monomers, i.e., above scavenger quantity.

The coupled polymers obtained were examined by gel permeation chromatography in order to determine the coupling efficiency and the coupling degree. The results obtained by this determination are shown in the following Table III:

TABLE III

| Run No. | Acetic Anhy. mhm | Coupling Efficiency, %$^{(a)}$ | Coupling Degree$^{(b)}$ |
|---|---|---|---|
| 1 | 0.25 | 40 | 2.3 |
| 2 | 0.5 | 60 | 1.8 |

(a) Coupling efficiencies were calculated from gel permeation chromatography (GPC). Efficiency values were determined by measuring the height of the peak for the residual parent polymer present in the coupled product ($P_c$). This was then compared with the height of the parent peak before coupling ($P_p$) and the efficiency calculated from:

$$\text{Coupling efficiency} = 100\left(\frac{P_p - P_c}{P_p}\right)$$

(b) The degree of coupling, i.e., the average number of polymer chains coupled per molecule of coupling agent, was determined by fixing the position of the GPC peak of the parent polymer, determining the molecular weight at this count from calibration tables derived using the universal calibration curve as per G. Kraus and C. J. Stacy, J. Poly. Sci. Symposium No. 43, 329-343 (1973), then marking the positions of dichain, trichain and tetrachain (and higher) products also determined from the calibration tables. The degree of coupling can then be estimated by interpolation of the now calibrated GPC curve.

The results shown above indicate that the acetic anhydride is an effective coupling agent for polymer-lithium. Furthermore, the results indicate that a coupling degree above 2 is obtained in Run 1, which is surprising since the structure of the acetic anhydride would indicate a degree of coupling not higher than 2.

EXAMPLE IV

This is a calculated example to demonstrate the way the coupled polymers can be hydrogenated. A sample of the coupled mixture obtained in accordance with Example II is taken prior to the addition of isopropyl alcohol or any other hydrogen donor. The sample is warmed to 70° C in a stirred reactor and 0.5 php nickel hydrogenation catalyst (preformed by reduction of nickel octanoate with triethylaluminum at a 2/1 mole ratio of nickel compound/aluminum compound) is added. The reactor is pressured to 50 psig (350 kPa) with hydrogen and maintained at 70° C for 3 hours with constant stirring. The reaction mixture is then treated with air and aqueous ammonium phosphate prior to filtration to remove catalyst residues. The solvent is removed by steam stripping and the polymer is recovered by filtration and drying. By this procedure, a considerable portion of the olefinic unsaturation of the coupled polymer is removed, which makes this polymer more resistant towards the attack of oxygen and ozone.

Reasonable variations and modifications can be made in this invention without departing from the spirit and scope thereof.

I claim:
1. A polymer having the structure

(I)

wherein the radicals R, which can be the same or different, are hydrocarbyl radicals with 1 to 7 carbon atoms, R' is a divalent radical selected from the group consisting of

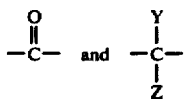

wherein Y is selected from the group of radicals consisting of —OH and —Z, and wherein Z is a homopolymer or copolymer chain of one or more conjugated alkadienes of 4 to 12 carbon atoms per molecule or a copolymer chain of at least one alkadiene of 4 to 12 carbon atoms and at least one monovinyl-substituted arene radical of 8 to 18 carbon atoms per molecule, the vinyl radical being attached to a carbon atom of the arene ring, with the further provision that at least 160 polymer chains Z are present in 100 molecules of formula (I).

2. A polymer in accordance with claim 1 wherein R is an alkyl radical with 1 to 3 carbon atoms.

3. A polymer in accordance with claim 1 wherein R is methyl.

4. A polymer in accordance with claim 1 wherein the polymer chain Z is selected from the group consisting of homopolymers and copolymers of butadiene and isoprene and of copolymers of butadiene and/or isoprene with styrene and/or a methyl styrene.

5. A polymer in accordance with claim 1 wherein the polymer chain radicals Z have the structure A-B-, wherein A is a polystyrene block and B is a rubbery block obtained by polymerizing or copolymerizing an alkadiene selected from the group consisting of butadiene, isoprene and mixtures thereof.

6. A polymer in accordance with claim 1 wherein Z is polybutadiene.

* * * * *